No. 839,401. PATENTED DEC. 25, 1906.
M. MILCH.
ALTERNATING CURRENT MOTOR.
APPLICATION FILED JUNE 17, 1904.

Witnesses:
Irving E. Steers.
Helen Alford.

Inventor:
Maurice Milch.
by Albert G. Davis
Atty

No. 839,401. PATENTED DEC. 25, 1906.
M. MILCH.
ALTERNATING CURRENT MOTOR.
APPLICATION FILED JUNE 17, 1904.

2 SHEETS—SHEET 2.

Witnesses.
J. Ellis Glen.
Helen Oxford.

Inventor.
Maurice Milch
by Albert H. Davis
Atty.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

No. 839,401.

Specification of Letters Patent.

Patented Dec. 25, 1906.

Application filed June 17, 1904. Serial No. 212,962.

*To all whom it may concern:*

Be it known that I, MAURICE MILCH, a subject of the Emperor of Austria-Hungary, residing at Schenectady, county of Schenectady, State of New York, have invented certain new and useful Improvements in Alternating-Current Motors, of which the following is a specification.

My invention relates to alternating-current motors of the commutator type in which the magnetic field produced by the field-winding is at an angle to that produced by the armature-winding. My invention consequently is particularly applicable to alternating-current series motors.

In order to improve the efficiency and power factor of motors of this type, it has been proposed heretofore to short-circuit equipotential points on the field-winding. The short-circuiting connections form, with the field winding, closed circuits in inductive relation to the armature, and consequently act as short-circuited secondaries for the armature-winding, thereby improving the efficiency and power factor of the motor.

My invention relates to motors provided with such connections between equipotential points; and one object of my invention is to provide a novel form of connections for such motors, whereby the field-winding is utilized to the best advantage, both for producing a field at an angle to that of the armature and also for neutralizing the self-induction of the armature.

A second object of my invention is to so connect the field-winding that a commutating-field is produced for the armature. By this means the efficiency of the motor is further increased and the commutation is improved without the necessity of employing auxiliary commutating-coils.

My invention will best be understood by reference to the accompanying drawings, in which—

Figure 1:
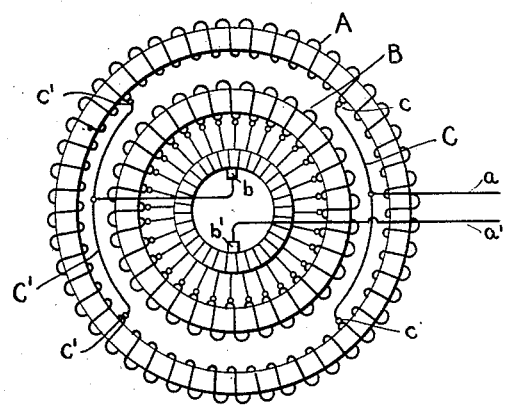
Figure 2:
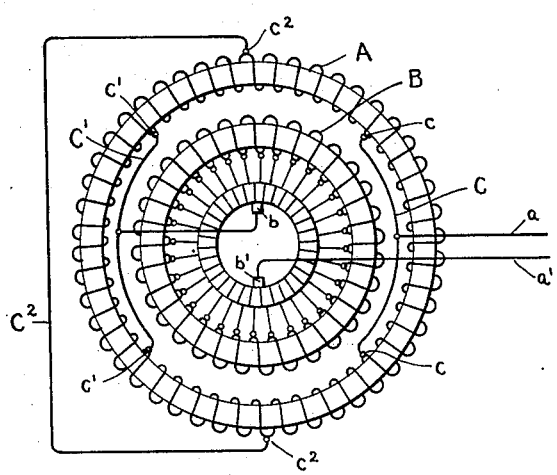
Figure 3:
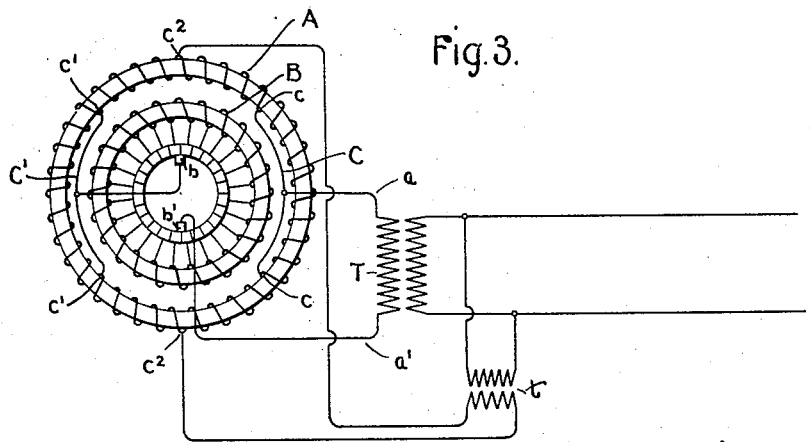
Figure 6:
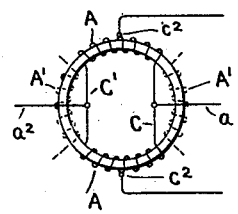
Figure 4:
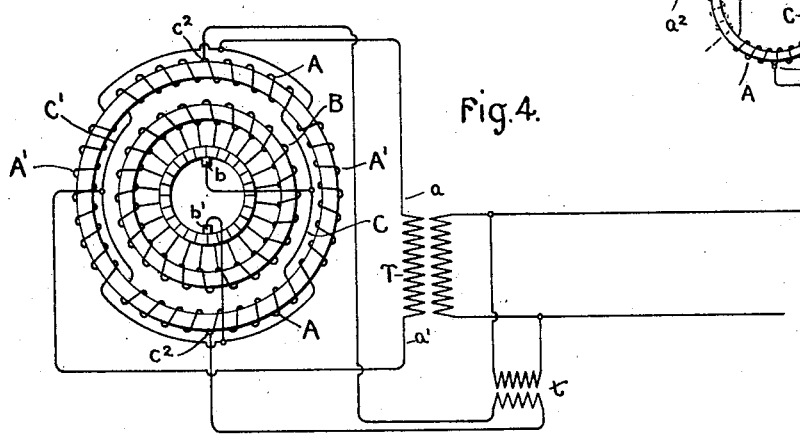
Figure 5:
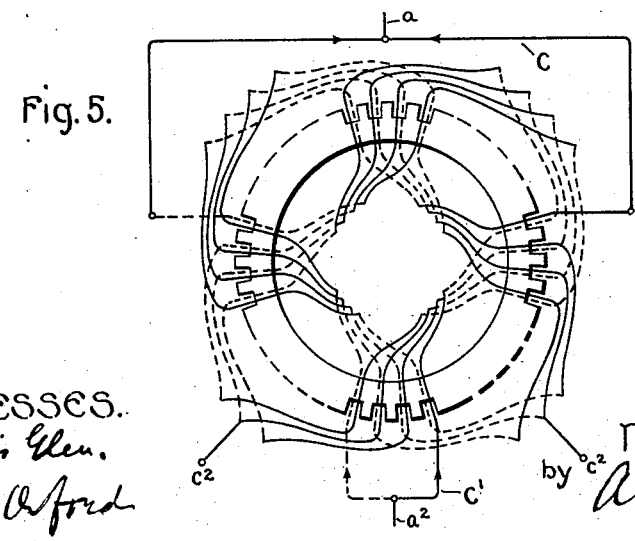

Figure 1 shows diagrammatically the motor connected in accordance with my invention so as to utilize the field-winding to the best advantage for producing the field magnetization and also for neutralizing the armature self-induction. Fig. 2 shows a modification of the same. Fig. 3 shows an additional connection for the field-winding for producing a commutating-field. Fig. 4 shows a modified arrangement of the field-winding, the portions for neutralizing the armature self-induction being connected in series with the armature instead of being short-circuited. Fig. 5 shows a development of a portion of a field-winding arranged and connected in accordance with my invention, and Fig. 6 is an explanatory diagram.

In the drawings, A represents the field-winding of an alternating-current motor.

B represents the armature-winding provided with a commutator and commutator-brushes $b\ b'$.

C represents a conductor connecting the equipotential points $c\ c$ on the field-winding.

$C'$ represents a similar conductor connecting the equipotential points $c'\ c'$.

Since the points $c\ c$ are equipotential with respect to the magnetization produced by the field-winding, the short-circuiting connection C has no direct effect upon the field magnetization. The short circuit C, however, is parallel to the line of magnetization produced by the armature-winding, and consequently forms, with the portion of the field-winding between the points $c\ c$, a closed circuit in inductive relation to the armature-winding. This closed circuit acts as a short-circuited secondary to neutralize the self-induction of the armature, and thereby to increase the power factor and efficiency of the motor. It will be seen, moreover, that in Fig. 1 the short-circuiting connections C and $C'$ are utilized as the terminals of the field-winding instead of employing field-terminals at two points displaced from each other by one hundred and eighty degrees. The current which flows in at the motor-terminal $a$ divides and passes through the portions of winding A between upper points $c\ c'$ and between lower points $c\ c'$ and from there to the commutator-brush $b$, through the armature-winding, out at brush $b'$ to the second motor-terminal $a'$. It is only the portions of the winding A between points $c$ and $c'$, which carry the exciting-current and which serve to produce the field flux at an angle to that of the armature. It will be seen that these portions of the field-winding are most favorably disposed for producing a field of uniform density facing the armature-winding.

The other portions of field-winding A— *i. e.*, those between points $c$ and $c$ and between $c'$ and $c'$—carry only the current due to the electromotive force induced in those portions of the field-winding. These portions, moreover, are most favorably disposed for neutralizing the self-induction of the armature. Consequently the several portions of the field-winding are utilized to the best advantage both for producing the field magnetization and for neutralizing the self-induction of the armature.

Of course it is not essential that the two currents in the field-winding should be kept entirely distinct. The same portion of the field-winding may carry the whole or portions of both currents. Thus in Fig. 2 while only portions of the winding A are utilized for producing the field magnetization in the same manner as in Fig. 1 a third short-circuiting connection $C^2$ is provided between the points $c^2$ $c^2$. The portions of the field-winding that are active for producing the field magnetization consequently carry a portion of the compensating current also in the arrangement of Fig. 2.

In Fig. 3 is shown an arrangement for causing the field-winding itself to produce a commutating-field for the armature. The equipotential points $c^2$ $c^2$ are connected to an auxiliary source of current, such as the transformer $t$, and a third current is thus introduced into the motor. The current entering at the upper terminal $c^2$ divides, part passing in one direction to upper point $c$ and part passing in the opposite direction to upper point $c'$. The two parts then pass through the short-circuiting connections C and C', respectively, and in opposite directions through the rest of the field-winding to the lower terminal $c^2$. Thus it will be seen that poles are produced at the points $c^2$ $c^2$. These poles are directly opposite the brushes $b$ $b'$, and consequently if the potential impressed upon the points $c^2$ $c^2$ is of the proper magnitude and phase an effective commutating-field will be produced, whereby the commutation of the motor will be greatly improved and the efficiency further increased. It will be observed that the portions of the field-winding employed for producing the commutating-fields are those most favorably located for this purpose. Furthermore, the insertion of the commutating electromotive force between terminals $c^2$ $c^2$ does not interfere with the damping action produced by this connection, but the armature self-induction is neutralized in the same manner as by connection $C^2$ in Fig. 2. The field-winding itself is thus made to perform the function of the commutating-coils disclosed in my application for Letters Patent, Serial No. 202,134, filed April 8, 1904. In this former application I have disclosed a number of arrangements for obtaining an electromotive force of the proper magnitude and phase for producing a suitable commutating-field, and although in Fig. 3 of the present application I have shown the commutating electromotive force derived from a transformer $t$, connected in shunt to the transformer T, supplying the motor, it will be understood that any of the arrangements disclosed in my former application or any other suitable arrangements may be utilized for obtaining a proper magnitude and phase for the commutating electromotive force.

It is not essential that the field-winding should be composed of a single continuous winding. It may be divided into separate portions, if preferred, the proper portions being utilized for producing the field magnetization and the other portions being short-circuited to neutralize the armature self-induction, or, if preferred, the latter portions may be connected in series with the armature instead of being short-circuited, the effect as regards neutralizing the armature induction being substantially the same in both cases. Thus in Fig. 4 I have shown the field-winding in four portions, two of which, A A, are connected in parallel with each other and in series with the armature to produce the field magnetization at an angle to that of the armature in the same manner as in the former arrangements. The other two portions A' A', which in the former figures have been shown as portions of a continuous winding, are in this figure shown independent and instead of being short-circuited are connected in parallel with each other and in series with the armature-winding. The result as regards neutralizing the armature self-induction is the same as though these portions were short-circuited.

In Fig. 5 I have shown a development of a portion of a distributed field-winding arranged in accordance with my invention and adapted for a four-pole motor. The portion of the winding shown is indicated in full lines in Fig. 6, while the remaining portion, which may form, with the portion shown, a continuous winding or which may be independent thereof and which may be short-circuited or connected in series with the armature, is indicated by the dotted winding A' A' in Fig. 6. $a$ $a^2$ represent the field-terminals, while $c^2$ $c^2$ represent the terminals upon which is impressed the commutating-voltage. By tracing out the winding between the terminals $a$ and $a^2$ it will be seen that the points $c^2$ $c^2$ are equipotential points on the winding.

The developed winding shown is only one of a large number of windings to which my invention is applicable, and the arrangement and connections of the motor-windings may be modified in various ways without departing from the spirit of my invention. I aim in the appended claims to cover all such modifications.

What I claim as new, and desire to secure by Letters Patent of the United States, is—

1. In an alternating-current motor, an armature-winding provided with a commutator and brushes, and short-circuiting connections between equipotential points on the field-winding, said connections being utilized and connected as the terminals of the field-winding.

2. In an alternating-current motor, an armature-winding provided with a commutator and brushes, and conductors connecting equipotential points on the field-winding, said conductors forming the terminals for the field-winding.

3. In an alternating-current motor, an armature-winding provided with a commutator and brushes, and conductors connecting points on the field-winding on lines parallel to the line of magnetization produced by the armature-winding, said conductors forming the terminals for the field-winding.

4. In an alternating-current motor, an armature-winding provided with a commutator and brushes, and a field-winding having parallel portions connected to produce a magnetization at an angle to that produced by the armature-winding and having its remaining portions connected to neutralize the self-induction of the armature-winding.

5. In an alternating-current motor, an armature-winding provided with a commutator and brushes, and a field-winding having parallel portions connected to produce a magnetization at an angle to that produced by the armature-winding and having its remaining portions connected to form closed circuits in inductive relation to the armature-winding.

6. In an alternating-current motor, an armature-winding provided with a commutator and brushes, conductors connecting equipotential points on the field-winding, and a source of current connected to equipotential points on the portions of the field-winding between said conductors.

7. In an alternating-current motor, an armature-winding provided with a commutator and brushes, conductors connecting equipotential points on the field-winding, and a source of current connected to points on the field-winding midway between said conductors.

8. In an alternating-current motor, an armature-winding provided with a commutator and brushes, a field-winding having parallel portions connected in series with the armature and arranged to produce a magnetization at an angle to that produced by the armature-winding, and a source of current connected to equipotential points on said portions.

9. In an alternating-current motor, an armature-winding provided with a commutator and brushes, a distributed field-winding connected in series with the armature, and a source of current connected to equipotential points on said winding to produce commutating-fields at said points.

10. In an alternating-current motor, an armature-winding provided with a commutator and brushes, a field-winding having parallel portions adjacent to the brushes connected in series with the armature and arranged to produce a magnetization at an angle to that produced by the armature-winding, and a source of current connected to equipotential points on said portions to produce a commutating-field for the armature-coils short-circuited by said brushes.

11. In an alternating-current motor, an armature-winding provided with a commutator and brushes, a field-winding having parallel portions connected to produce a magnetization at an angle to that produced by the armature-winding and having its remaining portions connected to neutralize the self-induction of the armature, and a source of current connected to equipotential points on the first-named portions to produce a commutating-field for the armature-coils short-circuited by the brushes.

12. In an alternating-current motor, an armature-winding provided with a commutator and brushes, conductors connecting equipotential points on the field-winding so as to form closed circuits in inductive relation to the armature-winding, and a source of current connected to equipotential points on the field-winding between said conductors to produce a commutating-field for the armature-coils short-circuited by the brushes.

13. In an alternating-current motor, an armature-winding provided with a commutator and brushes, a field-winding connected in series with the armature, and short-circuiting connections between equipotential points on the field-winding, said connections being utilized and connected as the terminals of the field-winding.

14. In an alternating-current motor, an armature-winding provided with a commutator and brushes, a distributed winding connected in series with the armature, conductors connected to equipotenital points on the field-winding, and a source of current connected to equipotential points on the portions of the field-winding between said conductors.

In witness whereof I have hereunto set my hand this 15th day of June, 1904.

MAURICE MILCH.

Witnesses:
BENJAMIN B. HULL,
HELEN ORFORD.